(12) United States Patent
Baek et al.

(10) Patent No.: US 11,595,988 B2
(45) Date of Patent: Feb. 28, 2023

(54) METHOD AND DEVICE FOR PROVIDING LOCAL MBS IN WIRELESS COMMUNICATION SYSTEM

(71) Applicant: Samsung Electronics Co., Ltd., Suwon-si (KR)

(72) Inventors: Youngkyo Baek, Suwon-si (KR); Sangsoo Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 219 days.

(21) Appl. No.: 17/444,821

(22) Filed: Aug. 10, 2021

(65) Prior Publication Data

US 2022/0053455 A1    Feb. 17, 2022

(30) Foreign Application Priority Data

Aug. 12, 2020   (KR) .................. 10-2020-0101157
Mar. 26, 2021   (KR) .................. 10-2021-0039990

(51) Int. Cl.
*H04H 20/71*   (2008.01)
*H04W 72/30*   (2023.01)
*H04W 4/08*    (2009.01)

(52) U.S. Cl.
CPC ............ *H04W 72/30* (2023.01); *H04W 4/08* (2013.01)

(58) Field of Classification Search
CPC ........ H04W 72/005; H04W 4/08; H04W 8/18
USPC ......................................................... 370/312
See application file for complete search history.

(56) References Cited

U.S. PATENT DOCUMENTS

| 2018/0192289 | A1  | 7/2018 | Dao |
| 2021/0067958 | A1* | 3/2021 | Lee ................... H04W 12/0433 |
| 2021/0067960 | A1* | 3/2021 | Lee ................... H04W 12/0433 |
| 2021/0105196 | A1* | 4/2021 | Dao ....................... H04L 43/028 |
| 2021/0105665 | A1* | 4/2021 | Bennett ................. H04W 12/02 |

(Continued)

FOREIGN PATENT DOCUMENTS

| KR | 10-2021-0023614 A | 3/2021 |
| WO | 2020035129 A1 | 2/2020 |

(Continued)

OTHER PUBLICATIONS

International Search Report and Written Opinion of the International Searching Authority dated Nov. 17, 2021, in connection with International Application No. PCT/KR2021/010562, 6 pages.

(Continued)

*Primary Examiner* — Chuong T Ho

(57) ABSTRACT

The disclosure relates to a 5G or pre-5G communication system for supporting higher data transmission rates than 4G communication systems such as LTE systems. According to an embodiment, a method for receiving a multicast service by a UE in a wireless communication system comprises receiving, from an application function (AF), a multicast service announcement message including first information related to a local multicast and broadcast service (MBS), identifying that the UE is located in a local MBS area, and transmitting, to an access and mobility management function (AMF), a multicast session join request message for joining a multicast session for the local MBS, the multicast session join request message including second information corresponding to the first information.

12 Claims, 9 Drawing Sheets

(56) References Cited

U.S. PATENT DOCUMENTS

2021/0219106 A1* 7/2021 Li .................. H04W 60/04
2021/0281981 A1* 9/2021 Li .................. H04W 76/11
2021/0392466 A1* 12/2021 Liu ................. H04L 5/0053
2022/0210690 A1* 6/2022 Zhao ................ H04W 40/24

FOREIGN PATENT DOCUMENTS

WO   2020043266 A1   3/2020
WO   2020146076 A1   7/2020

OTHER PUBLICATIONS

3GPP TR 23.757 V0.4.0 (Jun. 2020), Technical Report, 3rd Generation Partnership Project; Technical Specification Group Services and System Aspects; Study on architectural enhancements for 5G multicast-broadcast services (Release 17), Jun. 2020, 157 pages.
Samsung, "KI#1, solution#6: update on MBS Service initiation procedure", 3GPP TSG-WG SA2 Meeting #139e-meeting, Jun. 1-12, 2020, S2-2003901, 4 pages.
Samsung, "KI#1, solution#6: update on MBS Service initiation procedure", 3GPP TSG-WG SA2 Meeting #139e-meeting, Jun. 1-12, 2020, S2-2004492, 5 pages.
Supplementary European Search Report dated Jan. 2, 2023 in connection with European Patent Application No. 21 85 6183, 9 pages.

* cited by examiner

METHOD AND DEVICE FOR PROVIDING LOCAL MBS IN WIRELESS COMMUNICATION SYSTEM

CROSS-REFERENCE TO RELATED APPLICATIONS

This application is based on and claims priority under 35 U.S.C. 119 to Korean Patent Application No. 10-2020-0101157, filed on Aug. 12, 2020, in the Korean Intellectual Property Office, and Korean Patent Application No. 10-2021-0039990, filed on Mar. 26, 2021, in the Korean Intellectual Property Office, the disclosure of both of which is herein incorporated by reference in its entirety.

BACKGROUND

1. Field

To transmit the same data to a plurality of UEs located in a specific area in a mobile communication network, data may be transmitted to each UE by unicast. In some cases, for resource efficiency, a data service needs to be provided to a plurality of UEs located in a mobile communication network through multicast/broadcast.

In this case, there is a need for a scheme for efficiently switching between a local MBS service and a global MBS service when a specialized MBS service is provided in a local area.

2. Description of Related Art

In order to meet the demand for wireless data traffic soaring since the 4G communication system came to the market, there are ongoing efforts to develop enhanced 5G communication systems or pre-5G communication systems. For the reasons, the 5G communication system or pre-5G communication system is called the beyond 4G network communication system or post LTE system.

For higher data transmit rates, 5G communication systems are considered to be implemented on ultra-high frequency bands (mmWave), such as, e.g., 60 GHz. To mitigate pathloss on the ultra-high frequency band and increase the reach of radio waves, the following techniques are taken into account for the 5G communication system: beamforming, massive multi-input multi-output (MIMO), full dimensional MIMO (FD-MIMO), array antenna, analog beamforming, and large scale antenna.

Also being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (CoMP), and interference cancellation.

There are also other various schemes under development for the 5G system including, e.g., hybrid FSK and QAM modulation (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

To transmit the same data to a plurality of UEs located in a specific area in a mobile communication network, data may be transmitted to each UE by unicast. In some cases, for resource efficiency, a data service needs to be provided to a plurality of UEs located in a mobile communication network through multicast/broadcast.

For example, a need exists for a method for transmitting data via multicast/broadcast to provide a TV/audio service, a vehicle-to-everything (V2X) service, or a massive consumer Internet of things (CIoT) service to multiple UEs in a specific area.

SUMMARY

To transmit data through multicast/broadcast, network functions (NFs) or NF services need to be defined, and relevant multicast/broadcast services (MBSs), such as exposing, discovering, or selecting a corresponding NF or NF service, may be supported.

In this case, there is a need for a scheme for efficiently switching between a local MBS service and a global MBS service when a specialized MBS service is provided in a local area.

According to an embodiment, a method for receiving a multicast service by a user equipment (UE) in a wireless communication system comprises receiving, from an application function (AF), a multicast service announcement message including first information related to a local multicast and broadcast service (MBS), identifying that the UE is located in a local MBS area, and transmitting, to an access and mobility management function (AMF), a multicast session join request message for joining a multicast session for the local MBS, the multicast session join request message including second information corresponding to the first information.

According to an embodiment, the first information related to the local MBS may include at least one of a temporary mobile group identity (TMGI) for the UE, information indicating whether the local MBS is providable, service area information for the local MBS, an ID of a local AF, a fully qualified domain name (FQDN) of the local AF, or address information for a local multicast and broadcast service user plane (MBSU).

According to an embodiment, the multicast service announcement message may further include at least one of an ID of an MBS service session provided to the UE, service area information for a global MBS, an ID of a global AF, an FQDN of the global AF, or address information for a global MBSU.

According to an embodiment, the second information included in the multicast session join request message may include at least one of a TMGI for the UE, an ID of an MBS service session to be joined by the UE, information indicating a service for the local MBS, an ID of a local AF, or an FQDN of the local AF.

According to an embodiment, a media anchor for a multicast session for the local MBS may be switched from a global MBSU to a local MBSU based on the second information included in the multicast session join request message.

According to an embodiment, a method for providing a multicast service by an AF in a wireless communication system comprises identifying first information related to a local MBS to provide the local MBS to a UE and transmitting, to the UE, a multicast service announcement message including the first information related to the local MBS.

When the UE is located in a local MBS area, a multicast session join request message for the UE to join a multicast session for the local MBS may be transmitted from the UE to an access and mobility management function (AMF).

According to an embodiment, a UE configured to receive a multicast service in a wireless communication system comprises a transceiver and a controller operably coupled to the transceiver and configured to control the transceiver to receive, from an AF, a multicast service announcement message including first information related to a local MBS, identify that the UE is located in a local MBS area, and transmit, to an AMF, a multicast session join request message for joining a multicast session for the local MBS, the multicast session join request message including second information corresponding to the first information.

According to an embodiment, an AF configured to provide a multicast service in a wireless communication system comprises a transceiver and a controller operably coupled to the transceiver and configured to control the transceiver to identify first information related to a local multicast and broadcast service (MBS) to provide the local MBS to a user equipment (UE) and transmit, to the UE, a multicast service announcement message including the first information related to the local MBS.

When the UE is located in a local MBS area, a multicast session join request message for the UE to join a multicast session for the local MBS may be transmitted from the UE to an access and mobility management function (AMF).

According to an embodiment, it is possible to differentiate procedures according to services by changing the control operation of the MB-SMF depending on the MBS service (multicast service or broadcast service) requested by the AF or contents provider.

As is apparent from the foregoing description, according to embodiments of the disclosure, it is possible to provide an MBS service capable of effectively switching between a local MBS service and a global MBS service in a 5G system (5GS).

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, wherein.

DETAILED DESCRIPTION

Figure 1:
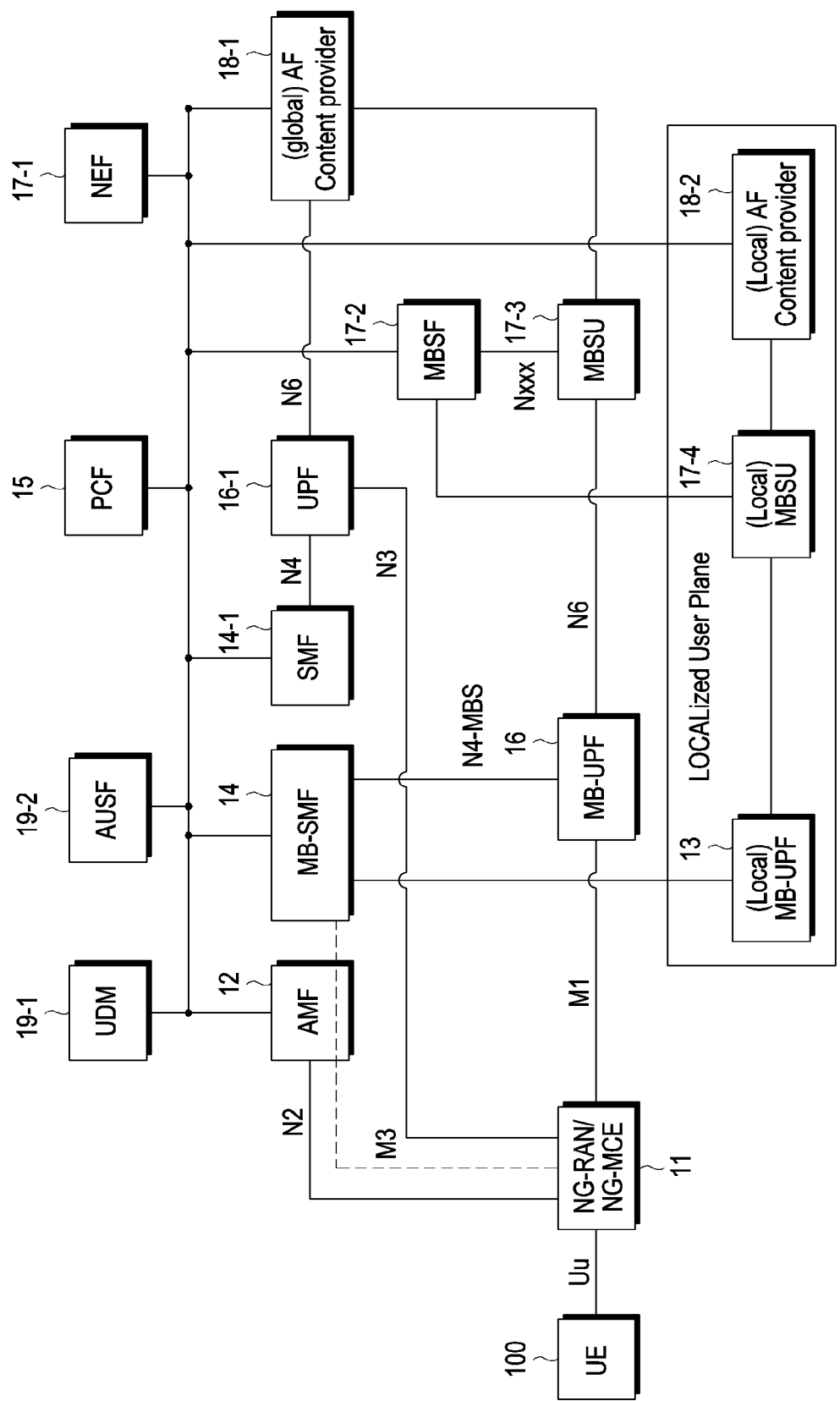
FIG. 1 illustrates a 5GS structure for an MBS according to an embodiment.

FIGS. 1 through 7B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, the operational principle of the disclosure is described below with reference to the accompanying drawings. When determined to make the subject matter of the disclosure unclear, the detailed of the known functions or configurations may be skipped. The terms as used herein are defined considering the functions in the disclosure and may be replaced with other terms according to the intention or practice of the user or operator. Therefore, the terms should be defined based on the overall disclosure.

As used herein, terms for identifying access nodes, terms denoting network entities, terms denoting messages, terms denoting inter-network entity interfaces, and terms denoting various pieces of identification information are provided as an example for ease of description. Thus, the disclosure is not limited to the terms, and the terms may be replaced with other terms denoting objects with equivalent technical meanings.

For ease of description, the disclosure adopts terms and names defined in 5G system standards. However, the disclosure is not limited by such terms and names and may be likewise applicable to systems conforming to other standards.

In this document, the term "global" is the opposite of the term "local," meaning that it is not limited to some specific area, such as a local MBS service area. As used herein, global MBS service, global MBS service area, global AF, global MBSU, global MB-UPF, global service, and global multicast session are designated by the term "global" to represent the opposite concepts (i.e., to mean that they are not used in a local area) of local MBS service, local MBS service area, local AF, local MBSU, local MB-UPF, local service, and local MBS service, respectively and are used to mean a general MBS service, MBS service area, AF, MBSU, MB-UPF, service, and multicast session.

It is preferable not to change the MBS group ID (e.g., TMGI) and the multicast service session ID when the user equipment (UE) switches to the local MBS service. Otherwise (i.e., if the MBS group ID and multicast service session ID is changed when switching to the local MBS service), a continuous update procedure of the UE and a complicated detection procedure or multi-session ID setup procedure according to the location are required.

Also, when the MBS group ID is shared among a plurality of AFs, some AFs may provide local services to their local AFs but other AFs do not provide local services (where the AFs may be distinguished by the multicast service session ID).

For example, some multicast services support some local MBS services (e.g., some local AFs are present), but other multicast services do not support local MBS services (e.g., other MBS content is not provided for the local service area, local AFs are absent).

Therefore, one MBS group ID and multicast service session ID are allocated for the multicast group regardless of whether the UE uses the local MBS service.

For the multicast service supporting the local MBS service, when the UE moves into the local MBS service area and requests a supporting local MBS service, a localized node (e.g., a local MB-UPF, local MBSU, or local AF) may be used for the local MBS service on behalf of a (non-local) MB-UPF/MBSU/AF according to the location of the UE and a UE request for subscription to the local MBS service.

FIG. 1 illustrates the structure of a cellular system for an MBS service according to an embodiment.

Referring to FIG. 1, a cellular system may include a UE 10, an NG radio access network/NG multicell/multicast coordination entity (NG-RAN/NG-MCE) 11, an access and mobility management function (AMF) 12, a local multicast/broadcast user plane function (MB-UPF) 13, a multicast/broadcast-session management function (MB-SMF) 14, a policy control function (PCF) 15, an MB-UPF 16, a network exposure function (NEF) 17-1, a multicast/broadcast service function (MBSF) 17-2, a multicast/broadcast service user plane (MBSU) 17-3, a local MBSU 17-4, a global application function (AF) 18-1, a local AF 18-2, a unified data management (UDM) 19-1, and an AUSF 19-2.

To support an MBS service in a legacy 5GS, a cellular system for MBS may be configured of the following network functions and services.

The AFs 18-1 and 18-2 may be implemented as, e.g., V2X application servers, CIoT application servers, MCPTT applications, contents providers, TVs or audio service providers, or streaming video service providers.

The MBSF 17-2 is a network function that manages the session for an MBS service and controls the traffic of the MBS service if the AF 18-1 or 18-2 requests the MBS service, and the MBSU 17-3 is an MBS service media anchor in the 5GS, which receives media from the contents provider and processes the media traffic based on the control of the MBSF 17-2.

The interface between the MBSF 17-2 and the MBSU 17-3 is referred to as an Nxxx interface. According to an embodiment, the MBSU 17-3 and the MBSF 17-2 may be integrated into one entity or one NF.

The MBSF 17-2 may be integrated into the NEF 17-1 or another NF.

The MBS service session is managed and service traffic is generated through the MBSF 17-2 and the MBSU 17-3. When the service traffic is transferred to the UE via multicast/broadcast, an MBS PDU session may be allocated to manage the traffic.

The control functions or services for creating an MBS context for the MBS PDU session, managing the MBS PDU session, and delivering the traffic of the MBS PDU session to the NG-RAN 11 through IP multicast are collectively referred to as a multimedia broadcast-multicast service gateway-control plane (MBMS-GW-C) service.

The MBMS-GW-C service may be integrated into an existing SMF that manages a unicast PDU session and be configured as an SMF having an MB S PDU session control function, or may be configured as a separate NF. An NF that supports the MBMS-GW-C service and also has the functions of an existing SMF may be referred to herein as an MB-SMF 14.

The services of transferring, via IP multicast, the traffic received from the MB-UPF 16 according to the MBS context for the MBS PDU session to the NG-RAN 11 performing multicast/broadcast according to the MBMS-GW-C service are collectively referred to as a multimedia broadcast-multicast service gateway-user plane (MBMS-GW-U) service.

The MBMS-GW-U service may be integrated into the existing UPF that processes a unicast PDU session and be configured as a UPF with the function of delivering the MBS traffic to an appropriate NG-RAN via IP multicast, or may be configured as a separate NF.

An NF that supports the MBMS-GW-U service and also has the functions of an existing UPF may be referred to herein as an MB-UPF 16.

The MBMS-GW-C service uses an N4-MBS interface to control the MBMS-GW-U service.

In describing various embodiments of the disclosure, the MBMS-GW-C and MBMS-GW-U are mainly described as the terms "SMF" and "UPF," respectively, or the terms "MB-SMF" and "MB-UPF," respectively, for convenience, but as necessary, their use may be signified together, such as whether they are for unicast only, multicast/broadcast only, or both, so as to avoid confusion.

The MBS traffic is delivered from the MBMS-GW-U (or UPF or MB-UPF) to NG-RANs. For example, the MBS traffic is transmitted to the NG-RAN using IP multicast. In this case, the tunnel between the MBMS-GW-U (or UPF or MB-UPF) and the NG-RAN is called an M1 tunnel, a shared delivery tunnel, or a shared N3 tunnel.

To establish the M1 tunnel, the MBMS-GW-C (or SMF or MB-SMF) sends a control message to the NG-RAN through the AMF.

For local MBS services as well as the (global) MBS services, all or some of the AFs, MBSUs or MB-UPFs may be located near a specific local area for an MBS service in the specific local area. These may be referred to as a local AF, a local MBSU, and a local MB-UPF.

The local MBSU 17-4, together with the (global) MBSU, may be controlled through the MBSF, and the local MB-UPF 13, along with the (global) MB-UPF, may be controlled through the MB-SMF.

In another deployment scenario, according to an embodiment, for local MBS services, all or some of the MBSFs or MB-SMFs, as well as the AFs, MBSUs, or MB-UPFs, may be located near the specific local area for an MBS service in the specific local area. These are referred to as a local MBSF and a local MB-SMF.

Figure 2A:
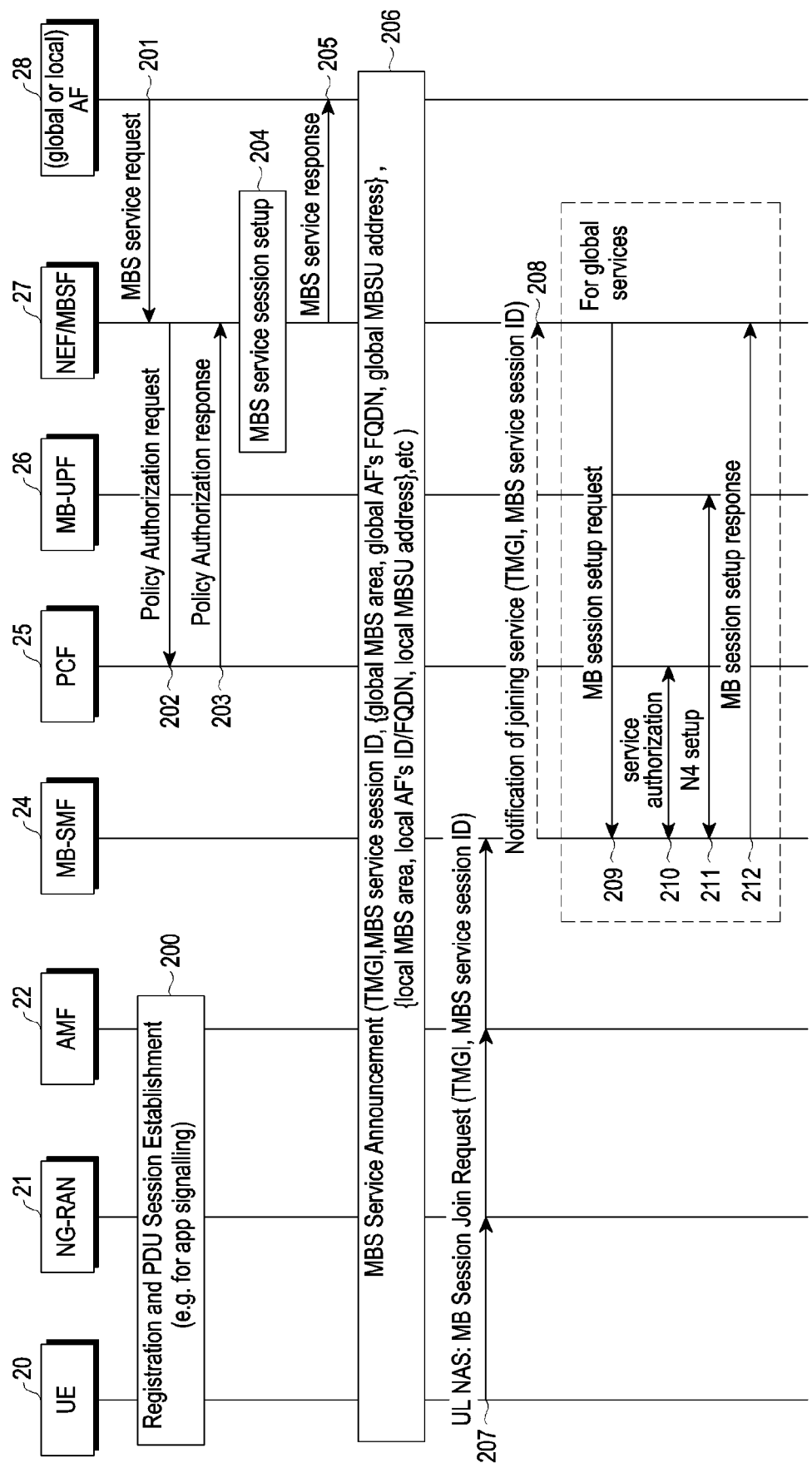
FIGS. 2A and 2B illustrate a process of switching from a global MBS service to a local MBS service according to an embodiment.
Figure 2B:
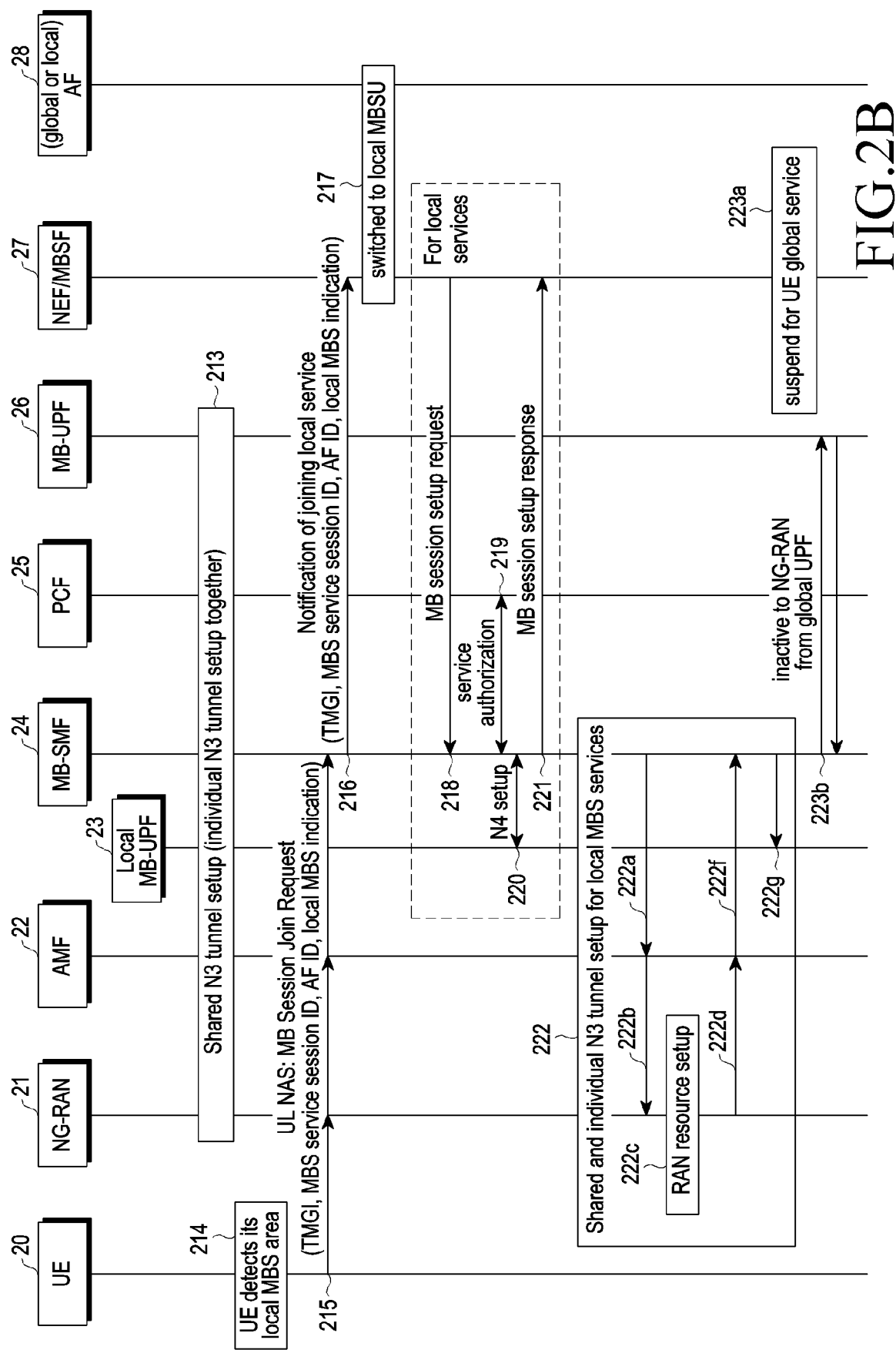

FIGS. 2A and 2B illustrate a process for starting an MBS session over a 5G network and a process of switching from a global MBS service to a local MBS service according to an embodiment.

Referring to FIGS. 2A and 2B, a cellular system may include a UE 20, an NG radio access network (NG-RAN) 21, an AMF 22, a local MB-UPF 23, an MB-SMF 24, a PCF 25, an MB-UPF 26, a network exposure function/multicast/broadcast service function (NEF/MBSF) 27, and a global or local application function (AF) 28.

A scenario in which the local MB-UPF 23, local MBSU, and local AF 28 are used as localized entities for a local MBS service is described with reference to FIGS. 2A and 2B.

Referring to FIG. 2A, in operation 200, the UE 20, the NG-RAN 21, and the AMF 22 may perform a registration and PDU session establishment procedure. The registration and PDU session establishment procedure may be performed, e.g., through app signaling.

In operation 201, the AF 28 or a contents provider may request an MBS service while delivering information for the MBS service to the MBSF 27 so as to provide the MB S service through the 5GS.

The information for the MBS service may include a service ID (e.g., TV service, video service, radio service, IoT service, V2X service, or public safety service) indicating the type of the MBS service or information including more detailed service information (e.g., a service ID indicating an IoT service for a subscriber of a specific company, a channel x TV service, a police network service among public safety services, or a firefighter network service among public safety services).

The information for the MBS service may also include information for the MBS service area in which the MBS service is provided (e.g., whole or part of area information for an actual map or a cell ID list, or a tracking area identifier (TAI) list).

The information for the MBS service may also include a multicast group ID list (e.g., a TMGI list or a range of corresponding temporary mobile group identities (TMGIs)) which is a list of groups of UEs capable of receiving the service.

The information for the MBS service may also include characteristics of traffic generated by the MBS service (e.g., 5QI, resource type (e.g., all or some of the GBR, delay critical GBR, or non-GBR), maximum bit rate, guaranteed bit rate, maximum delay tolerance, maximum packet loss rate, priority level, and maximum data burst volume), as QoS information.

The information for the MB S service may also include information for the local MBS service in the specific local area. For example, as information regarding the local MBS service area, the whole or part of area information for the actual map, cell ID list, and TAI list may be included, or service information for the local MBS service in the local service area may be included.

The MBSF 27, which receives the request in operation 201, may transmit, to the PCF 25, the information received in operation 201 and the obtained characteristic information for the traffic generated due to the MB S service in operation 202 and may receive an authorization for the service in operation 203. In other words, in operation 202, the MBSF/NEF 27 may transmit a policy authorization request to the PCF 25. In operation 203, the MBSF/NEF 27 may receive, from the PCF 25, a policy authorization response which is a response to the policy authorization request. Further, the MBSF 27 may additionally identify the authorization for the MBS service for the multicast group ID to the UDM.

If the MBS service is determined to be authorized, in operation 204, the MBSF 27 may set up an MBS service session, assign an MBS service session ID, determine an ID (e.g., TMGI value) of the group of the UE using the service, select an MBSU corresponding to the MB S service area, and obtain address information for the MBSU. Further, multicast group ID information and the address or ID of the MBSF, which assigns and manages the MBS service session ID, may be stored in the UDM.

According to an embodiment, when a separate local MBSU is configured for the location corresponding to the local MBS service, the MBSF 27 may obtain address information for the local MBSU corresponding to each local MBS service area (e.g., TAI list or cell ID list).

In operation 205, the NEF/MBSF 27 may transfer, to the AF 28, an MBS service response containing the information determined (or obtained) via operations 202 to 204. For example, at least one of the address of the MBSU corresponding to the determined TMGI and MBS service area, address information for the local MBSU corresponding to each local MBS service area, or MBS service session ID information may be transferred to the AF 28 via operation 205.

In operation 206, the AF 28 may transfer information for the UE 20 to receive the multicast service via an announcement message (a multicast service announcement message or multicast service declaration message).

The announcement message may include at least one of the multicast group ID (e.g., TMGI) of the UE, the ID of the MBS service session to be received by the UE, (global) MBS service area information, DNN information, the ID (or FQDN or IP address) of the (global) AF, or the FQDN (or IP address) of the (global) MBSU.

Further, the announcement message may include an indication that a local MBS service is possible if a local MBS service is possible for the AF or MBS service session and may include information to be used in the local MBS service area.

For example, the announcement message may include at least one of (local) MBS service area information, the ID (or FQDN or IP address) of the (local) AF, or the FQDN (or IP address) of the (local) MBSU.

When a different local AF or local MBSU, which serves the local MBS service area, is configured per cell or per TA, the announcement message may include the ID, FQDN, or IP address of the (local) AF, or the FQDN or IP address of the (local) MBSU for each cell or TA.

As another method, the UE 20 may obtain information to be used in the local MBS service area. When it is detected that the UE 20 is relocated in the local MBS service area, the UE 20 may transmit, to the global or local AF 28, an MBS service information request including the location for the current location of the UE 20 and an indication of the local MBS service.

For example, the MBS service information request message may include global positioning system (GPS) information for the UE 20 and information for the TA or cell to which the UE 20 stays connected.

Upon receiving the MBS service information request message, the AF 28 may transmit information for the local MBS service corresponding to the location information to the UE 20.

For example, the information for the local MBS service corresponding to the location information may include at least one of the TMGI, the ID of the MBS service session to be received by the UE, (local) MBS service area information, the ID (or FQDN or IP address) of the (local) AF, or the FQDN (or IP address) of the (local) MBSU.

According to an embodiment, if the MBS service session is such that the MBS service is served only in the local MBS service area, the information may be included only in the information for the local MBS service and, if the MBS service is served in the global MBS service area as well as the local MBS service area, the MBS service session ID may be shared between the local service and the global service.

In operation 207, the UE 20 may transmit a NAS message to the AMF 22 to join the multicast session, and the AMF 22 may select an appropriate MB-SMF 24 and transfer, to the selected MB-SMF 24, a join request message for the multicast session received from the UE 20.

The join request message for the multicast session, which is a NAS message transmitted from the UE 20 to the AMF 22 may include at least one of the ID (e.g., the TMGI) of the multicast group to which the UE 20 belongs, the MBS service session ID which is information for the MBS service session to be joined, DNN information which is information for the AMF 22 to select the MB-SMF 24, or a corresponding AF ID.

The NAS message may be implemented as a separate NAS message, a PDU session establishment request message, or a PDU session modification request message.

Upon receiving the join message, the MB-SMF 24 may request and obtain, from the UDM, SM subscription data, determining whether the UE is able to receive an MBS service through the multicast group ID. The MB-SMF 24 may request and obtain, from the UDM, SM subscription data, determining whether the UE is able to receive the MBS service session ID through the multicast group ID. Further, the MB-SMF 24 may figure out the ID or address of the MBSF managing the MBS service session ID through the multicast group ID, from the UDM.

If an MB session for the MBS service session has not been set up yet, the MB-SMF 24 may transmit a message (notification of joining service) for requesting to join the multicast session to the NEF/MBSF 27 in operation 208.

The join request message (notification of joining service) may include at least one of the ID (e.g., TMGI) of the multicast group to which the UE 20 belongs, the MBS service session ID that is information for the MBS service session to be joined, or the corresponding AF ID.

Even when an MB session for the MBS service session has been set up, the MB-SMF 24 receiving the join message may notify that the UE 20 has requested the NEF/MBSF 27 to join the multicast session in operation 208.

The MB-SMF 24, the PCF 25, and the NEF/MBSF 27 may perform procedures (operations 209 to 212) for global services.

The MBSF 27, receiving the join message, may determine whether the join request is accepted and whether the UE may use the MBS service from its own information or from the UDM or the AF.

Upon determining that the UE may use the MBS service, the MBSF 27 may request to the MB-SMF 24 to set up an MB session in operation 209 and, in operation 210, the MB-SMF 24 may receive a service authorization from the PCF 25.

The MB-SMF 24 may request and obtain, from the UDM, SM subscription data, determining whether the UE is able to receive the MBS service through the multicast group ID. The MB-SMF 24 may request and obtain, from the UDM, SM subscription data, determining whether the UE is able to receive the MBS service session ID through the multicast group ID.

In operation 211, the MB-SMF 24 may select the MB-UPF 26 to set up a shared delivery tunnel for the MB session and set up an N4. In operation 212, the MB-SMF 24 may transmit, to the NEF/MBSF 27, an MB session setup response message including information for the MB session ID and tunnel and obtained point information for the MB-UPF 26 to the NEF/MBSF 27 and set up an MB session for a (global) multicast service.

Referring to FIG. 2B, if a shared delivery tunnel, i.e., a shared N3 tunnel between the NG-RAN 21 and the MB-UPF 26, for the MB session, is not set, a shared delivery tunnel may be generated between the NG-RAN 21 and the MB-UPF 26 in operation 213.

In other words, the MB-SMF 24 may transfer an SM N2 message containing tunnel end point information for the MB-UPF 26 of the shared delivery tunnel, to the NG-RAN 21 through the AMF 22, set up a resource for shared delivery of the NG-RAN 21, and request the MB-SMF 24 to join the IP multicast from the MB-UPF 26 to the NG-RAN 21 for the MB session. Thus, the MB-SMF 24 may receive the information from the MB-UPF 26 and set up a shared delivery tunnel between the NG-RAN 21 and the MB-UPF 26.

A NAS message, which is responsive to the join request from the UE 20 in operation 207, along with an N2 SM message or an N2 MM message for the UE 20, may be transferred to the NG-RAN 21 via operations 213a and 213b alongside operation 213, and the NG-RAN 21 may manage the context of the MB session for shared delivery together with the SM context for the PDU session of the UE 20.

Thus, the NG-RAN 21 may figure out (or determine) what UE the MBS traffic transferred through shared delivery should be forwarded to.

The NG-RAN 21 may transfer, to the UE 20, an AS message containing the NAS message. The NAS message may include information, e.g., the TMGI, along with the result of joining, and the AS message may include information for the RAN resource to be used by the UE 20.

If the UE 20 is aware that it is located in the local MBS service area through, e.g., the cell ID value or TA value obtained from the NG-RAN 21 in operation 214, the UE 20 may transmit a NAS message to the AMF 22 to request to join the multicast session for the local MBS service so as to receive the local MBS service in operation 215, and the AMF 22 may transfer, to the MB-SMF 24, the multicast session join request message received from the UE 20.

The message for requesting to join the multicast session, which is a NAS message transmitted from the UE 20 to the AF 28, may include a local MBS indication for the local MBS service and may include at least one of the ID (e.g., the TMGI) of the multicast group to which the UE 20 belongs, the MBS service session ID which is information for the MBS service session to be joined, DNN information which is information for the AMF 22 to select the MB-SMF 24, or a corresponding ID or FQDN.

If it is known that the request from the UE 20 is one for joining the local MB S service, from the AF ID or the FQDN of the AF since the AF corresponding to the local MBS service differs from the AF for the global MBS service, the local MBS indication may be excluded. Instead of the separate NAS message, a PDU session establishment request message or a PDU session modification request message may be used.

Upon receiving the join message, the MB-SMF 24 may request and obtain, from the UDM, SM subscription data, determining whether the UE is able to receive a local MB S service through the multicast group ID.

The MB-SMF 24 may request and obtain, from the UDM, SM subscription data, determining whether the UE is able to receive the MBS service session ID, via a local MBS service, through the multicast group ID. Further, the MB-SMF 24 may figure out the ID or address of the MBSF managing the MBS service session ID through the multicast group ID, from the UDM.

If an MB session for the local MBS service for the MBS service session has not been set up yet, the MB-SMF 24 may send a message for requesting the NEF/MBSF 27 to join the multicast session in operation 216.

The join request message may include a local MBS indication of the local MB S service and may include all or some of the ID (e.g., TMGI) of the multicast group to which the UE 20 belongs, the MBS service session ID that is information for the MBS service session to be joined, and the corresponding AF ID. Even when an MB session for the MBS service session has been set up, the MB-SMF 24 receiving the join message may also notify that the UE 20 has requested the NEF/MBSF 27 to join the multicast session in operation 216.

If the local MBS service is possible for the MBS service session, the NEF/MBSF 27 and the AF 28 may switch the media anchor for the MBS service session from global MBSU to local MBSU in operation 217. If no MBS service session has been created between the local MBSU and the local AF in the step, the MBSF 27 may update it with the changed local MBSU address for the AF 22.

In operation 218, the NEF/MBSF 27 requests the MB-SMF 24 to set up an MB session for the local MBS service and, in operation 219, the MB-SMF 24 may perform a service authorization procedure with the PCF 25. The MB-SMF 24 may request and obtain, from the UDM, SM subscription data, determining whether the UE is able to receive a local MBS service through the multicast group ID. The MB-SMF 24 may request and obtain, from the UDM, SM subscription data, determining whether the UE is able to receive the MBS service session ID, via a local MBS service, through the multicast group ID.

In operation 220, the MB-SMF 24 may select an MB-UPF and set up an N4 for establishing a shared delivery tunnel for the MB session. In operation 221, the MB-SMF 24 may transmit, to the NEF/MBSF 27, the obtained MB-UPF tunnel end point information and MB session ID information through an MB session setup response message and may set up an MB session for the (local) multicast service.

If a shared delivery tunnel, i.e., a shared N3 tunnel between the NG-RAN 21 and the (local) MB-UPF 23, has not been set yet for the MB session for the local MBS service, a shared delivery tunnel may be created in operation 222.

In other words, the MB-SMF 24 may transfer an SM N2 message containing tunnel end point information for the MB-UPF 26 of the shared delivery tunnel, to the NG-RAN 21 through the AMF 22, set up a resource for shared delivery of the NG-RAN 21, and request the MB-SMF 24 to join the IP multicast from the MB-UPF 26 to the NG-RAN 21 for the MB session. Thus, the MB-SMF 24 may receive the information from the MB-UPF 26 and set up a shared delivery tunnel between the NG-RAN 21 and the MB-UPF 26.

A message, in the form of a NAS or AS message, responsive to the join request from the UE 20 in operation 215 may be transferred to the UE 20 in operation 222. If the response message is a NAS message, the response message may include information, such as local MBS indication and TMGI, along with the result of joining and, if it is an AS message, the response message may include information for the RAN resource to be used by the UE 20.

To check if the UE 20 is in the local MBS area, the AMF 22 or the NG-RAN 21 may keep the MB-SMF 24 updated for the location information for the UE 20. For example, when the UE 20 departs from the local MBS area, the MB-SMF 24 may be notified thereof.

Even after a local MBS service is conducted using the local MBSU as a media anchor in operation 217, the global MBS service ma continue through the global MBSU for serving other UEs. However, because there is no need, for the same NG-RAN, to maintain the shared delivery tunnel with the global MB-UPF 26 and the shared delivery tunnel with the local MB-UPF 23 for the same MBS service session, it is not needed to maintain the shared delivery tunnel between the NG-RAN and the global MB-UPF for the MBS service session.

In operation 223a, the MBSF 27 may suspend the joining state for the global MBS service of the UE 20. Alternatively, to stop forwarding traffic from the global MB-UPF 26 to the NG-RAN 21 for the MB session for the global MBS service, the MB-SMF 24 may suspend the NG-RAN 21 from joining the IP multicast, exclude the NG-RAN 21 upon forwarding traffic for the global MBS service from the global MB-UPF 26, or switch the MB session to an inactive state or deactivate the MB session in operation 223b.

Figure 3A:
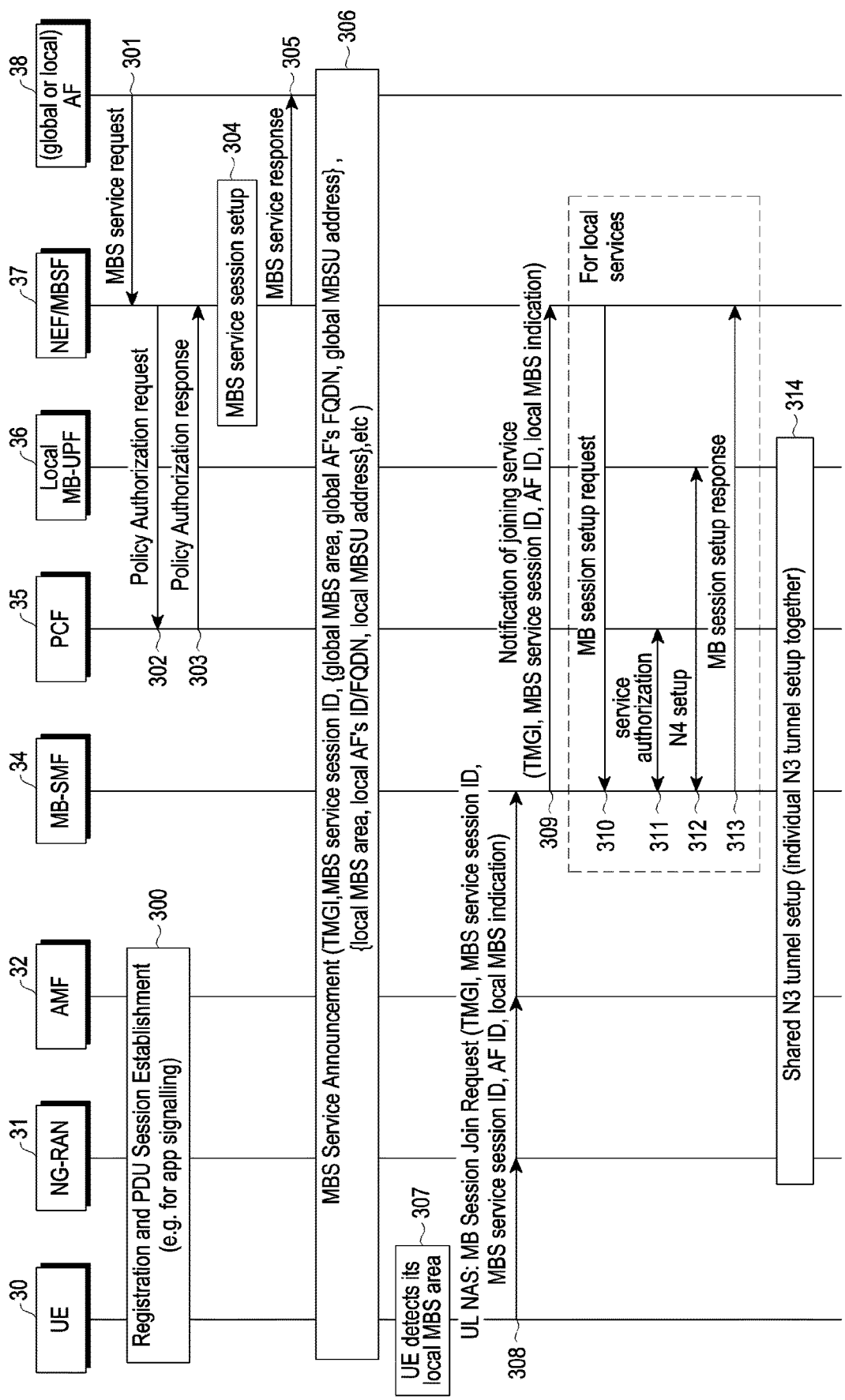
FIGS. 3A and 3B illustrate a process of switching from a local MBS service to a global MBS service according to an embodiment.
Figure 3B:
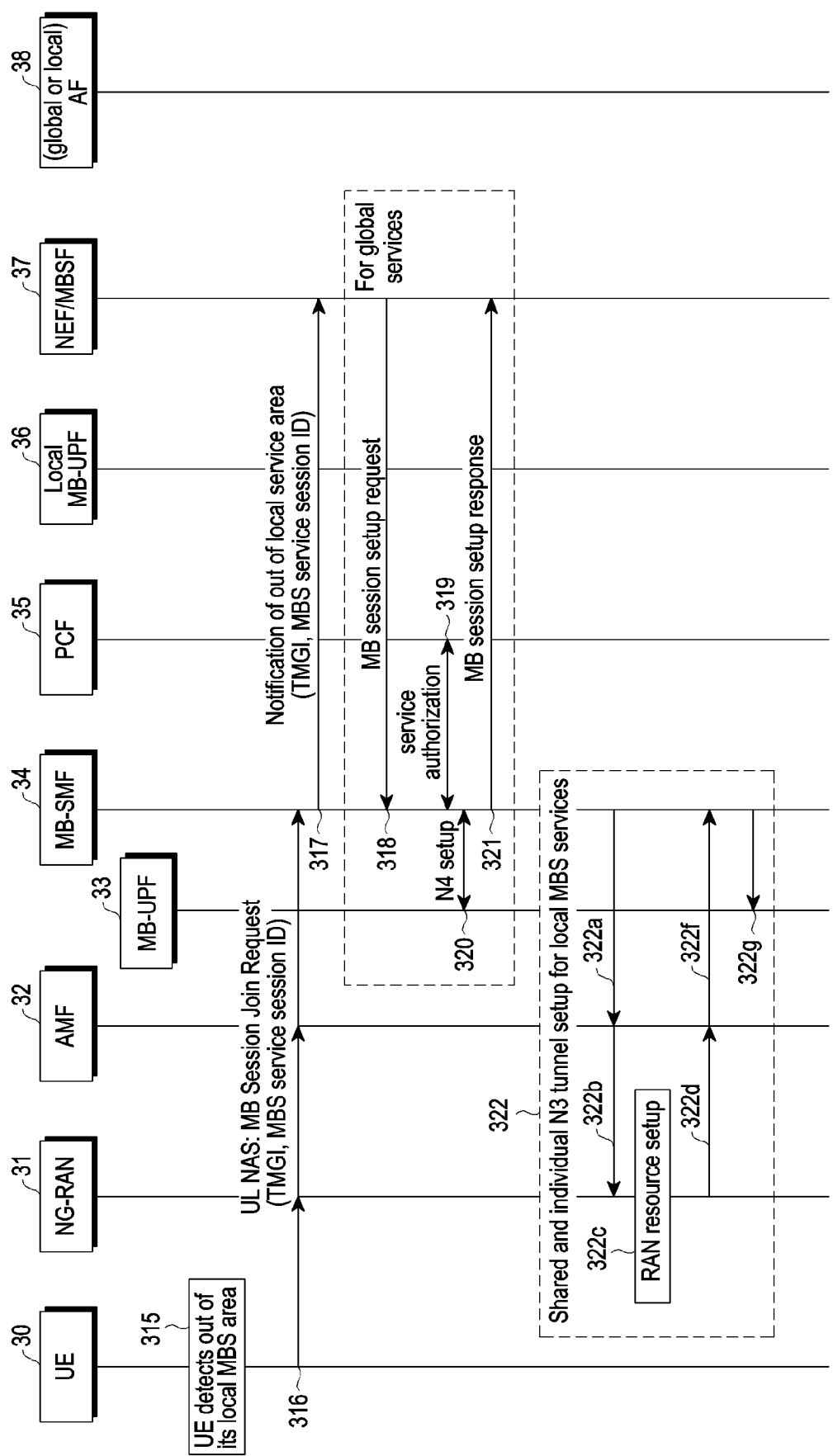

FIGS. 3A and 3B illustrate a process for starting an MBS session over a 5G network and a process of switching from a local MBS service to a global MBS service according to an embodiment.

An example in which a local MB-UPF, a local MBSU, and a local AF are used as localized entities for a local MBS service is described in connection with the embodiment.

Some of the operations or procedures of FIGS. 3A and 3B are substantially the same as some of the operations or procedures of FIGS. 2A and 2B, and thus, no duplicate description is given.

Referring to FIGS. 3A and 3B, a cellular system may include a UE 30, an NG-RAN 31, an AMF 32, a multicast/broadcast user plane function (MB-UPF) 33, an MB-SMF 34, a PCF 35, a local MB-UPF 36, an NEF/MBSF 37, and a global or local AF 38.

The process (operations 301 to 306) for starting an MBS session illustrated in FIG. 3A is basically performed through the same process as that described above in connection with FIG. 2. In other words, for an MBS service, the AF 38 requests the NEF/MBSF 37 to create an MBS service and sends a service announcement message to the UE 30 (operations 301 to 306).

The UE 30 recognizes that it is in the local MBS area in operation 307 and, in operation 308, the UE 30 may transmit a join request for using the local MBS service. The request is transferred to the NEF/MBSF 37 to set up an MB session for the local MBS service through the local MBSU, the local MB-UPF 36, and the local AF 38 (operations 309 to 313). Thus, a tunnel for shared delivery is set up (operation 314).

A NAS message, which is responsive to the join request from the UE 20 in operation 308, along with an N2 SM message or an N2 MM message for the UE 30, may be transferred to the NG-RAN 31 via operations 314a and 314b alongside operation 314, and the NG-RAN 31 may manage the context of the MB session for shared delivery together with the SM context for the PDU session of the UE 30.

Thus, the NG-RAN 31 may figure out (or determine) what UE the MBS traffic transferred through shared delivery should be forwarded to.

The NG-RAN 31 may transfer, to the UE 30, an AS message containing the NAS message. The NAS message may include information, e.g., the TMGI, along with the result of joining, and the AS message may include information for the RAN resource to be used by the UE 30.

To check if the UE 30 is in the local MBS area, the AMF 32 or the NG-RAN 31 may keep the MB-SMF 34 updated for the location information for the UE 30. For example, when the UE 30 leaves the local MBS area, the AMF 32 or the NG-RAN 31 may provide a notification to the MB-SMF 34.

If the UE 30 receiving the local MBS service moves out of the local MBS area (operation 315), the UE 30 may no longer receive the local MBS service and, if the UE 30 is in the global MBS area, the UE 30 may continuously receive the global MBS service.

If the NG-RAN 31 to which the UE 30 has moved does not serve traffic for the MBS service session to the multicast group ID (e.g., TMGI) corresponding to the UE 30, the UE 30 may, in operation 316, send a NAS message to the AMF 32 to join the multicast session, and the AMF 32 may transfer, to the MB-SMF 34, the message for requesting to join the multicast session, received from the UE 30.

The join request message for the multicast session, which is a NAS message transmitted from the UE 30 to the AMF 32 may include all or some of the ID (e.g., the TMGI) of the multicast group to which the UE 30 belongs, the MBS service session ID which is information for the MBS service session to be joined, DNN information, and a corresponding AF ID. The NAS message may be implemented as a separate NAS message, a PDU session establishment request message, or a PDU session modification request message.

In contrast, if the NG-RAN 31 to which the UE 30 has moved is already serving the traffic for the MBS service session to the multicast group ID (e.g., TMGI) corresponding to the UE 30, the UE 30 may send no separate join message.

Alternatively, if the MB-SMF 34 receives, from the AMF 32 or the NG-RAN 31, a notification that the UE 30 has departed from the local MBS area although no separate join message is received from the UE 30, the MB-SMF 34 may transmit, to the NEF/MBSF 37, a message indicating that it should depart from the local area and join the global multicast session (notification of out of local service area) in operation 317.

The notification message (notification of out of local service area) may include all or some of the ID (e.g., TMGI) of the multicast group to which the UE 30 belongs, the MBS service session ID that is information for the MBS service session to be joined, and the corresponding AF ID.

If an MB session is not set for the MBS service session, the MB-SMF 34 receiving the join message may transmit, to the NEF/MBSF 37, a notification message (notification of out of local service area) indicating that it should depart from the local area and join the global multicast session in operation 317.

The notification message (notification of out of local service area) may include all or some of the ID (e.g., TMGI) of the multicast group to which the UE belongs, the MBS service session ID, which is information for the MBS service session to be joined, and a corresponding AF ID.

Even when an MB session for the MBS service session has been set up, the MB-SMF 34 receiving the join message may transfer a notification to indicate that the UE 30 has requested the NEF/MBSF 37 to join the multicast session in operation 317.

In operation 318, the MBSF 37 receiving the join message may request the MB-SMF 34 to set up an MB session. In operation 319, the MB-SMF 34 may perform a service authorization procedure with the PCF 35. Then, in operation 320, the MB-SMF 34 may select an MB-UPF 33 and set up an N4 to establish a shared delivery tunnel for the MB session.

In operation 321, the MB-SMF 34 may transmit, to the NEF/MBSF 37, an MB session setup response message including information for the MB session ID and tunnel and obtained point information for the MB-UPF 33 to the NEF/MBSF 27 and set up an MB session for a global multicast service.

If a shared delivery tunnel, i.e., a shared N3 tunnel between the NG-RAN 31 and the MB-UPF 33, has not been set for the MB session, a shared delivery tunnel may be created in operation 322.

In operations 322a and 322b, the MB-SMF 34 may transfer, through the AMF 32 to the NG-RAN 31, an SM N2 message containing tunnel end point information for the MB-UPF 33 of the shared delivery tunnel.

In operation 322c, the NG-RAN 31 may set up a resource for shared delivery (RAN resource setup). In operations 322d to 322g, the MB-SMF 34 may be requested to join the IP multicast from the MB-UPF 33 to the NG-RAN 31 for the MB session. Thus, the MB-SMF 34 may transfer the information to the MB-UPF 33, thus setting up a shared delivery tunnel between the NG-RAN 31 and the MB-UPF 33.

By the above-described method, the UE 30 may receive the MBS service in the local MBS area and, if leaving the local MBS area, switch to the global MBS service.

Figure 4:
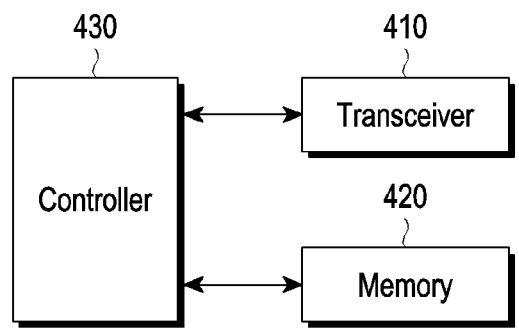
FIG. 4 illustrates a block diagram of an internal structure of a UE according to an embodiment.

FIG. 4 illustrates a block diagram of an internal structure of a UE according to an embodiment.

The UE described above in connection with FIGS. 1 to 3B may correspond to the UE of FIG. 4. Referring to FIG. 4, the UE may include a transceiver 410, a memory 420, and a controller 430 (also referred to as processor 430). The transceiver 410, controller 430, and memory 420 of the UE may operate according to the above-described communication methods by the UE. However, the components of the UE are not limited thereto. For example, the UE may include more or fewer components than the above-described components. The transceiver 410, the controller 430, and the memory 420 may be implemented in the form of a single chip. The controller 430 may include one or more processors.

The transceiver 410 collectively refers to a transmitter and a receiver of the UE and may transmit and receive signals to/from a base station, network entity, server, or another UE. The signals transmitted and received to/from the base station, network entity, server, or the other UE may include control information and data. To that end, the transceiver 410 may include a radio frequency (RF) transmitter for frequency-up converting and amplifying signals transmitted and an RF receiver for low-noise amplifying signals received and frequency-down converting the frequency of the received signals. However, this is merely an example of the transceiver 410, and the components of the transceiver 410 are not limited to the RF transmitter and the RF receiver.

The transceiver 410 may receive signals via a radio channel, output the signals to the controller 430, and transmit signals output from the controller 430 via a radio channel.

The memory 420 may store programs and data necessary for the operation of the UE. The memory 420 may store control information or data that is included in the signal obtained by the UE. The memory 420 may include a storage medium, such as ROM, RAM, hard disk, CD-ROM, and DVD, or a combination of storage media. Rather than being separately provided, the memory 420 may be embedded in the controller 430.

The controller 430 may control a series of processes for the UE to be able to operate according to the above-described embodiments. For example, the controller 430 may receive a control signal and a data signal through the transceiver 410 and process the received control signal and data signal. The controller 430 may transmit the processed control signal and data signal through the transceiver 410. There may be provided a plurality of controllers 430. The controller 430 may control the components of the UE by executing a program stored in the memory 420.

Figure 5:
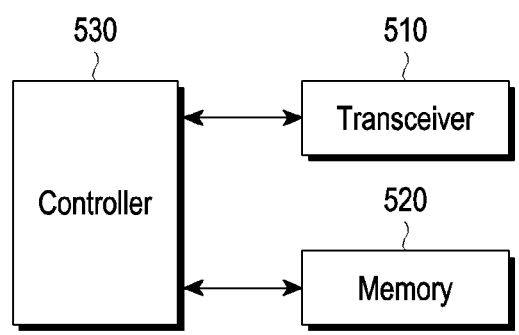
FIG. 5 illustrates a block diagram of a structure of a network entity according to an embodiment.

FIG. 5 illustrates a block diagram of a structure of a network entity according to an embodiment.

Each of the network entities described with reference to FIGS. 1 to 3B may include the components of FIG. 5. Each of the NG-RAN/NG-MCE 11, AMF 12, local MB-UPF 13, MB-SMF 14, PCF 15, MB-UPF 16, NEF 17-1, MBSF 17-2, MBSU 17-3, local MBSU 17-4, global AF 18-1, local AF 18-2, UDM 19-1, and AUSF 19-2 illustrated in FIG. 1 may include the components of FIG. 5.

Each of the NG-RAN 21, AMF 22, local MB-UPF 23, MB-SMF 24, PCF 25, MB-UPF 26, NEF/MBSF 27, and global or local AF 28 illustrated in FIGS. 2A and 2B may include the components of FIG. 5.

Each of the NG-RAN 31, AMF 32, MB-UPF 33, MB-SMF 34, PCF 35, local MB-UPF 36, NEF/MBSF 37, and global or local AF 38 illustrated in FIGS. 3A and 3B may include the components of FIG. 5.

Referring to FIG. 5, a network entity according to an embodiment may include a transceiver 510, a memory 520, and a controller 530. The transceiver 510, controller 530, and memory 520 of the network entity may operate according to the above-described communication methods by the network entity.

However, the components of the network entity are not limited thereto. For example, the network entity may include more or fewer components than the above-described components. The transceiver 510, the controller 530, and the memory 520 may be implemented in the form of a single chip. The controller 530 may include one or more processors.

The transceiver 510 collectively refers to a transmitter and a receiver and may transmit and receive signals to/from a base station, UE, network entity, or server. The signals transmitted and received to/from the base station, the UE, the network entity, or the server may include control information and data. To that end, the transceiver 510 may include a radio frequency (RF) transmitter for frequency-up converting and amplifying signals transmitted and an RF receiver for low-noise amplifying signals received and frequency-down converting the frequency of the received signals. However, this is merely an example of the transceiver 510, and the components of the transceiver 510 are not limited to the RF transmitter and the RF receiver.

The transceiver 510 may receive signals via a radio channel, output the signals to the controller 530, and transmit signals output from the controller 530 via a radio channel.

The memory 520 may store programs and data necessary for the operation of the network entity or server. The memory 520 may store control information or data that is included in the signal obtained by the network entity or server. The memory 520 may include a storage medium, such as ROM, RAM, hard disk, CD-ROM, and DVD, or a combination of storage media. Rather than being separately provided, the memory 520 may be embedded in the controller 530.

The controller 530 may control a series of operations to allow the network entity or server to operate as per the above-described embodiments. For example, the controller 530 may receive a control signal and a data signal through the transceiver 510 and process the received control signal and data signal. The controller 530 may transmit the processed control signal and data signal through the transceiver 510. There may be provided a plurality of controllers 530. The controller 530 may control the components of the network entity by executing a program stored in the memory 520.

Figure 6:
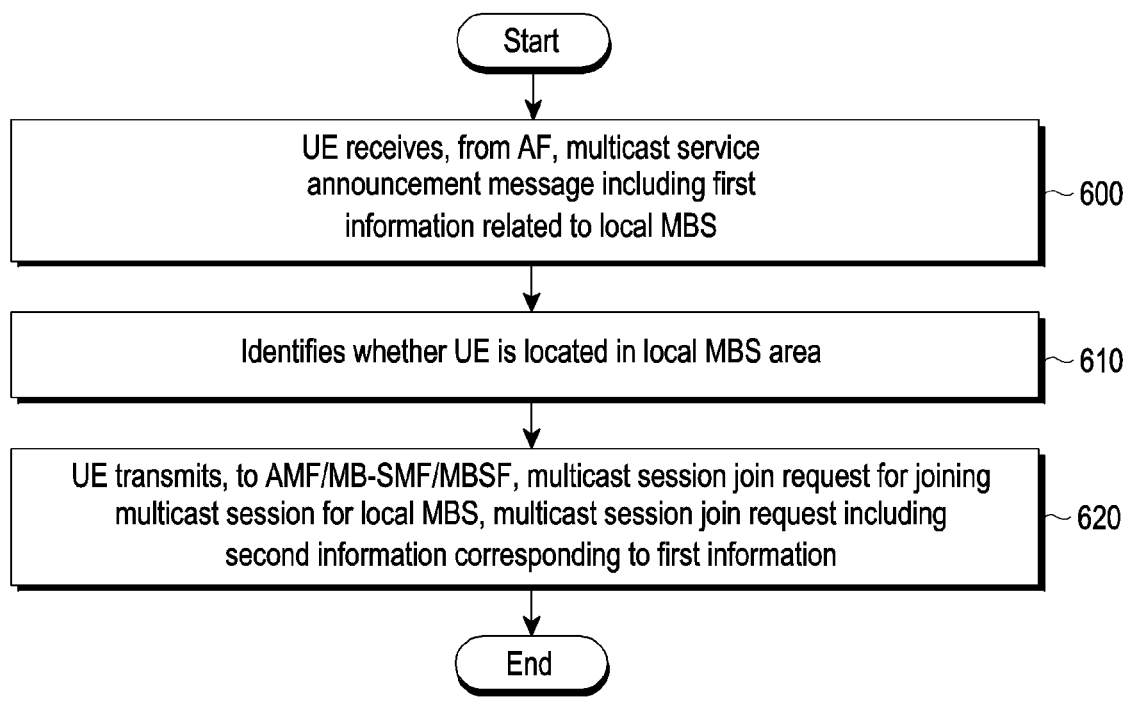
FIG. 6 illustrates a flowchart of a method for receiving a multicast service by a UE according to an embodiment.

FIG. 6 illustrates a flowchart of a method for receiving a multicast service by a UE according to an embodiment.

Referring to FIG. 6, in operation 600, a user equipment (UE) may receive, from an application function (AF), a multicast service announcement message including first information related to a local multicast and broadcast service (MBS) so as to receive a multicast service.

In operation 610, the UE may identify whether the UE is located in a local MBS area.

If the UE is located in the local MBS area, the UE may transmit, to an access and mobility management function (AMF), an MB-SMF, or an MBSF, a multicast session join request message for joining a multicast session for the local MBS. The multicast session join request message includes second information corresponding to the first information.

According to an embodiment, the first information related to the local MBS may include at least one of a temporary mobile group identity (TMGI) for the UE, information indicating whether the local MBS is providable, service area information for the local MBS, an ID of a local AF, a fully qualified domain name (FQDN) of the local AF, or address information for a local multicast and broadcast service user plane (MBSU).

According to an embodiment, the multicast service announcement message may further include at least one of an ID of an MBS service session provided to the UE, service area information for a global MBS, an ID of a global AF, an FQDN of the global AF, or address information for a global MBSU.

According to an embodiment, the second information included in the multicast session join request message may include at least one of a TMGI for the UE, an ID of an MBS service session to be joined by the UE, information indicating a service for the local MBS, an ID of a local AF, or an FQDN of the local AF.

According to an embodiment, a media anchor for a multicast session for the local MBS may be switched from a global MBSU to a local MBSU based on the second information included in the multicast session join request message.

Figure 7A:
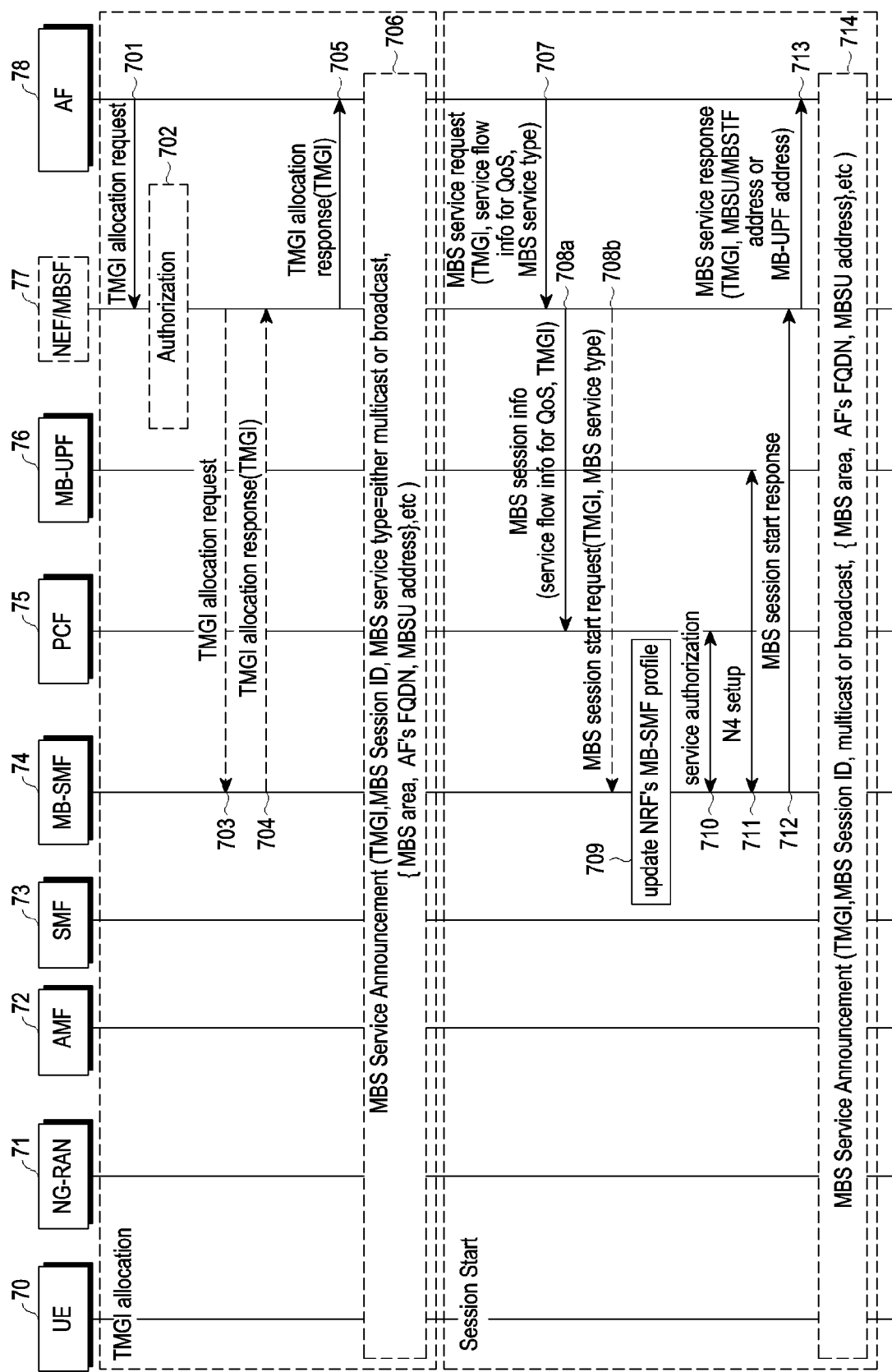
FIGS. 7A and 7B illustrate flowcharts of a method for creating a session for an MBS service of a 5GS according to an embodiment.
Figure 7B:
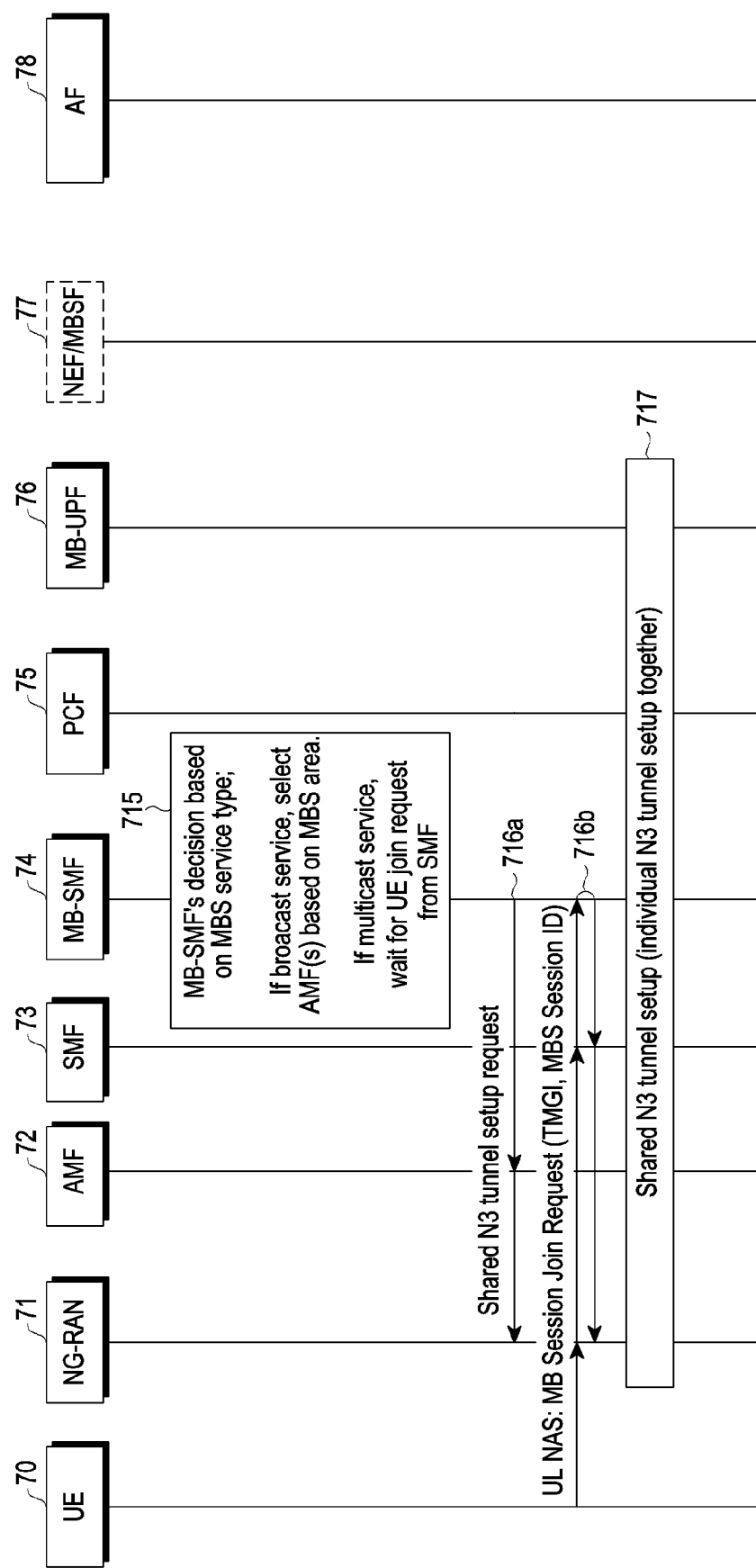

FIGS. 7A and 7B are flowcharts illustrating a method for creating a session for an MBS service of a 5GS according to an embodiment. FIGS. 7A and 7B illustrate a procedure for creating an MBS session for a multicast service and a broadcast service.

Referring to FIGS. 7A and 7B, a cellular system may include a UE 70, an NG-RAN 71, an AMF 72, a session management function (SMF) 73, an MB-SMF 74, a PCF 75, an MB-UPF 76, an NEF/MBSF 77, and an application function (AF) 78.

Referring to FIG. 7A, in operation 701, the AF 78 or a contents provider may send, to the NEF/MBSF 77, a request (TMGI allocation request) for allocating a TMGI to be used for designating a group of UEs using a service before requesting to start an MBS service so as to provide the MBS service through a 5GS. In operation 702, the NEF/MBSF 77 may perform an authorization for the TMGI allocation request.

In operation 702, upon receiving the TMGI allocation request, the NEF/MBSF 77 may check whether to allow the request. If the TMGI allocation request is allowed in operation 702, the NEF/MBSF 77 may request the MB-SMF 74 to allocate a TMGI in operation 703. The request message (TMGI allocation request) in operations 701 and 703 may include an existing TMGI value or an IP multicast address of a source to be served. The NEF/MBSF 77 or the MB-SMF 74 may allocate a new TMGI value appropriate for the request and, in operations 704 and 705, may transfer the allocated TMGI value to the NEF/MBSF 77 or the AF 78.

In operation 706, the AF 78 may transfer MBS service announcements to the UEs, thereby providing the allocated TMGI information and MBS service type information as to whether the MBS service is a multicast service or a broadcast service. In operation 707, the AF 78 may send a request for an MBS service while delivering information for the MBS service to the NEF/MBSF 77. The information for the MBS service may include information for the MBS service area in which the MBS service is provided (e.g., all or some of area information for an actual map, a cell ID list, or a TAI list). According to an embodiment, the information for the MBS service may include a TMGI, which is a group of UEs capable of receiving the service. According to an embodiment, the information for the MBS service may also include characteristics of traffic generated by the MBS service (e.g., 5QI, resource type (e.g., all or some of the GBR, delay critical GBR, or non-GBR), maximum bit rate, guaranteed bit rate, maximum delay tolerance, maximum packet loss rate, priority level, and maximum data burst volume), as QoS information.

According to an embodiment, the information for the MBS service may also include the type of the service, i.e., multicast service or broadcast service. According to an embodiment, if a TMGI is not yet allocated due to failure to pass through operations 701 to 705, the information for the MBS service may further include an indication of requesting to allocate a TMGI.

In operation 708a, the MBSF 77 may transmit, to the PCF 75, characteristic information for the traffic generated due to the MB S service and use it for authorization for a future service. The NEF/MBSF 77 may select an MB-SMF 74 to serve the MBS session through the NRF. In this case, the MB-SMF 74 may find an appropriate MB-SMF 74 by transferring the TMGI or MBS session ID and MBS service area information to the NRF and thereby request the NRF.

In operation 708b, the NEF/MBSF 77 may transmit an MBS session start request message to the selected MB-SMF 74. The MBS session start request message may include TMGI information and MBS service type, thereby notifying the MB-SMF 74 whether the service allocated to the TMGI is a multicast service or a broadcast service. Further, when a request for TMGI allocation is received from the AF 78, the MBS session start request message may enable the NEF/MBSF 77 to allocate a TMGI or may include an indication of requesting the MB-SMF to allocate a TMGI.

When requested to allocate a TMGI, the MB-SMF 74, which has received the message in operation 708b, may allocate an appropriate TMGI and generates a context for serving an MBS session. In operation 709, the MB-SMF 74 may provide the NRF with the address or ID of the MB-SMF along with the MBS session ID, i.e., TMGI information, thereby registering/updating the profile of the MB-SMF.

In operation 710, the MB-SMF 74 may identify an authorization for the MBS service with the PCF 75. When the MBS service is determined to be authorized, a user plane of the MBS service session may be set in operation 711, i.e., a tunnel ID and address/port information for the MB-UPF 76 to receive MBS traffic may be provided to the MB-SMF 74.

In operations 712 and 713, the MB-SMF 74 may transfer information generated for the MBS session service to the NEF/MBSF 77 or the AF 78. For example, in operations 712 and 713, the TMGI and the address/port information and tunnel ID for the MB-UPF 76 to receive traffic may be transferred. Upon receiving the message of operation 712, the NEF/MBSF 77 may transfer the TMGI and the address/port information and tunnel ID for the MB-UPF to receive traffic to the MBSU or a multicast-broadcast service traffic function (MBSTF), thereby setting a tunnel for transferring MBS traffic to the MB-UPF 76. In operation 713, the MBSU or MBSTF may provide the MBSF with the tunnel ID and address/port information for receiving MBS traffic, and the NEF/MBSF 77 may transfer the information along with the TMGI information to the AF 78.

If the MBS session starts, the AF 78 may transfer information for receiving an MBS service to the UE 70 via an announcement message (MBS service announcement message) in operation 714. The announcement message may include at least one of the TMGI, the ID of the MBS service session to be received by the UE, MBS service area information, DNN information, S-NSSAI information, the ID (or FQDN or IP address) of the AF, the FQDN (or IP address) of the MBSU, or the type of the MBS service.

Referring to FIG. 7B, in operation 715, the MB-SMF 74 may determine a subsequent operation according to the MBS service type received in operation 708b. In operation 715, the MB-SMF 74 may select appropriate AMFs based on the MBS service area received in operation 708a when the MBS service type is a broadcast service. In operation 716a, the MB-SMF 74 may send a request for setting up a shared tunnel to the selected AMFs, and the AMF 72 may transmit the request to the NG-RAN 71 which is in the MB S service area. The request may include, e.g., TMGI information, MB-SMF ID information, and QoS information. In operation 717, the NG-RAN 71 receiving the request may transfer endpoint information for the shared tunnel for receiving MBS service traffic to the MB-SMF 74 through the AMF 72, and the MB-SMF 74 may thus generate a shared tunnel between the NG-RAN 71 and the MB-UPF 76, with the MB-UPF 76.

In operation 715, if the MBS service type is a multicast service, a wait is performed until any UE sends a request for joining the MBS service. In operation 716b, when the UE 70 sends a request for joining the MBS session through the SMF 73, the SMF 73 refers to information for the requested TMGI and requests the NRF, thereby discovering the MB-SMF 74 serving the TMGI, and may request the discovered MB-SMF 74 to join or to generate a shared tunnel according to a join request. In operation 716b, the MB-SMF 74 may send a request for setting up a shared tunnel to the SMF 73, and the SMF 73 may send the request to the NG-RAN 71. The request may include, e.g., TMGI information, MB-SMF ID information, and QoS information. In operation 717, the NG-RAN 71 receiving the request may transfer endpoint information for the shared tunnel for receiving MBS service traffic to the MB-SMF 74 through the AMF 72, and the MB-SMF 74 may thus generate a shared tunnel between the NG-RAN 71 and the MB-UPF 76, with the MB-UPF 76.

The methods according to the embodiments descried in the specification or claims of the disclosure may be implemented in hardware, software, or a combination of hardware and software.

When implemented in software, there may be provided a computer readable storage medium storing one or more programs (software modules). One or more programs stored in the computer readable storage medium are configured to be executed by one or more processors in an electronic device. One or more programs include instructions that enable the electronic device to execute methods according to the embodiments described in the specification or claims of the disclosure.

The programs (software modules or software) may be stored in random access memories, non-volatile memories including flash memories, ROMs, electrically erasable programmable read-only memories (EEPROMs), magnetic disc storage devices, compact-disc ROMs, digital versatile discs DVDs), or other types of optical storage devices, or magnetic cassettes. Or, the programs may be stored in a memory constituted of a combination of all or some thereof. As each constituting memory, multiple ones may be included.

The programs may be stored in attachable storage devices that may be accessed via a communication network, such as the Internet, Intranet, local area network (LAN), wide area network (WLAN), or storage area network (SAN) or a communication network configured of a combination thereof. The storage device may connect to the device that performs embodiments of the disclosure via an external port. A separate storage device over the communication network may be connected to the device that performs embodiments of the disclosure.

In the above-described specific embodiments, the components included in the disclosure are represented in singular or plural forms depending on specific embodiments proposed. However, the singular or plural forms are selected to be adequate for contexts suggested for ease of description, and the disclosure is not limited to singular or plural components. As used herein, the singular forms "a," "an," and "the" are intended to include the plural forms as well, unless the context clearly indicates otherwise.

Although specific embodiments of the disclosure have been described above, various changes may be made thereto without departing from the scope of the disclosure. Thus, the scope of the disclosure should not be limited to the above-described embodiments, and should rather be defined by the following claims and equivalents thereof.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for controlling a service by a multicast and broadcast-session management function (MB-SMF) in a wireless communication system, the method comprising:

receiving multicast and broadcast service (MBS) information transmitted from an application function (AF) to the MB-SMF through a network exposure function/multicast and broadcast service function (NEF/MBSF), the MBS information including a service type indicating whether the service is a broadcast service or a multicast service;

identifying whether the service is the broadcast service or the multicast service based on the service type;

performing, by the MB-SMF, a first procedure towards an access and mobility management function (AMF) and a next generation-radio access network (NG-RAN) in case that the service is the broadcast service; and performing, by the MB-SMF, a second procedure with a session management function (SMF) in response to a MBS session join request of a user equipment (UE) in case that the service is the multicast service.

2. The method of claim 1, wherein the performing the first procedure in case that the service is the broadcast service comprises:

selecting the AMF based on a MBS service area; and transmitting, to the AMF, a resource setup request for a MBS session.

3. The method of claim 1, wherein the performing the second procedure in case that the service is the multicast service comprises:

receiving, from the SMF, a first request associated with the MBS session join request of the UE in case that the SMF discover the MB-SMF in response to the MBS session join request of the UE.

4. The method of claim 1, further comprising:

receiving, from the NG-RAN, endpoint information for a shared tunnel for receiving a MBS service traffic through the AMF.

5. The method of claim 2, wherein the resource setup request for the MBS session is forwarded from the AMF to the NG-RAN in case that the service is the broadcast service.

6. The method of claim 3, wherein the performing the second procedure in case that the service is the multicast service further comprises:

establishing resources for a MBS traffic delivery with a multicast and broadcast-user plane function (MB-UPF) and the NG-RAN.

7. A multicast and broadcast-session management function (MB-SMF) for controlling a service in a wireless communication system, the MB-SMF comprising:

a transceiver; and a controller coupled with the transceiver and configured to control to:

receive multicast and broadcast service (MBS) information transmitted from an application function (AF) to the MB-SMF through a network exposure function/multicast and broadcast service function (NEF/MBSF), the MBS information including a service type indicating whether the service is a broadcast service or a multicast service, identify whether the service is the broadcast service or the multicast service based on the service type, perform a first procedure towards an access and mobility management function (AMF) and a next generation-radio access network (NG-RAN) in case that the service is the broadcast service, and perform a second procedure with a session management function (SMF) in response to a MBS session join request of a user equipment (UE) in case that the service is the multicast service.

8. The MB-SMF of claim 7, wherein the controller is configured to control to:
- select the AMF based on a MBS service area in case that the service is the broadcast service comprises; and
- transmit, to the AMF, a resource setup request for a MBS session.

9. The MB-SMF of claim 7, wherein the controller is configured to control to:
- receive, from the SMF, a first request associated with the MBS session join request of the UE in case that the service is the multicast service and the SMF discover the MB-SMF in response to the MBS session join request of the UE.

10. The MB-SMF of claim 7, wherein the controller is configured to control to:
- receive, from the NG-RAN, endpoint information for a shared tunnel for receiving a MBS service traffic through the AMF.

11. The MB-SMF of claim 8, wherein the resource setup request for the MBS session is forwarded from the AMF to the NG-RAN in case that the service is the broadcast service.

12. The MB-SMF of claim 9, wherein the controller is configured to control to:
- establish resources for a MBS traffic delivery with a multicast and broadcast-user plane function (MB-UPF) and the NG-RAN.

* * * * *